United States Patent
Nakamura

(10) Patent No.: US 11,104,102 B2
(45) Date of Patent: Aug. 31, 2021

(54) HEAT-RESISTANT MEMBER

(71) Applicant: KABUSHIKI KAISHA TOYOTA CHUO KENKYUSHO, Nagakute (JP)

(72) Inventor: Daisuke Nakamura, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 16/929,236

(22) Filed: Jul. 15, 2020

(65) Prior Publication Data

US 2021/0154976 A1 May 27, 2021

(30) Foreign Application Priority Data

Nov. 26, 2019 (JP) .............................. JP2019-213722

(51) Int. Cl.
*B32B 9/00* (2006.01)
(52) U.S. Cl.
CPC ........ *B32B 9/007* (2013.01); *B32B 2305/026* (2013.01); *B32B 2307/306* (2013.01); *B32B 2307/308* (2013.01); *B32B 2307/72* (2013.01); *B32B 2307/732* (2013.01); *Y10T 428/24942* (2015.01); *Y10T 428/26* (2015.01)
(58) Field of Classification Search
CPC .............. B32B 9/007; B32B 2307/306; B32B 2307/308; B32B 2307/732; B32B 2305/026; B32B 2307/72; Y10T 428/26; Y10T 428/24942
See application file for complete search history.

(56) References Cited

U.S. PATENT DOCUMENTS

2013/0061800 A1* 3/2013 Nakamura ............ C30B 35/002
117/84

FOREIGN PATENT DOCUMENTS

| JP | 2013-75814 A | 4/2013 |
|---|---|---|
| JP | 2013-193943 A | 9/2013 |
| JP | 2015-44719 A | 3/2015 |
| JP | 2016-190762 A | 11/2016 |
| JP | 2017-75075 A | 4/2017 |
| JP | 2018-48053 A | 3/2018 |
| JP | 2018-145022 A | 9/2018 |

OTHER PUBLICATIONS

Gouy-Pailler, Ph. et al, "Tungsten and tungsten-carbon thin films deposited by magnetron sputtering", Journal of Vacuum Science & Technology A 11, 96-102 pp., Jan. 1993.
Zellner, Michael B. et al, "Synthesis, characterization and surface reactivity of tungsten carbide (WC) PVD films", Surface Science 569, 89-98 pp., Aug. 6, 2004.

* cited by examiner

*Primary Examiner* — David Sample
*Assistant Examiner* — Donald M Flores, Jr.
(74) *Attorney, Agent, or Firm* — Oliff PLC

(57) ABSTRACT

A heat-resistant member includes a base member composed of an isotropic graphite and a film with a single layer or multiple layers formed on the entire or partial surface of the base member. The film includes a dense WC layer with a single layer or multiple layers, and the dense WC layer includes WC as a main component and has a porosity of less than 3%. The film may further include a porous WC layer with a single layer or multiple layers formed on an entire or partial surface of the dense WC layer. In this case, the porous WC layer preferably includes WC as a main component and has a porosity larger than that of the dense WC layer.

10 Claims, 4 Drawing Sheets

HEAT-RESISTANT MEMBER

FIELD OF THE INVENTION

The present invention relates to heat-resistant members, more specifically, to heat-resistant members having both high corrosion resistance against a high-temperature corrosive gas and high emissivity.

BACKGROUND OF THE INVENTION

Semiconductor processes such as bulk single-crystal growth or epitaxial film formation of SiC or a group III nitride semiconductor are performed under severe process conditions. Members such as crucible or susceptor to be used for these processes (hereinafter, also collectively referred to as "heat-resistant members") are exposed to a high-temperature and highly-corrosive atmosphere during the processes. As such heat-resistant members, SiC-coated graphite members or pBN-coated graphite members have conventionally been used. These members, however, have such a problem that they have a short life in the present semiconductor process environment.

Various proposals have been made conventionally to overcome the problem. For example, Patent Literature 1 discloses a high-temperature heat-resistant member including a graphite base member composed of an isotropic graphite and a TaC film with a non-oriented granular structure covering the surface of the graphite base member.

The literature describes that:
(A) since the TaC film has a non-oriented granular structure, cracks are less likely to propagate,
(B) the graphite base member is therefore protected even if the high-temperature heat-resistant member is used for long hours in a high-temperature atmosphere, and
(C) such a high-temperature heat-resistant member can be used as a susceptor member to be used for the MOCVD epitaxial growth of a group III nitride.

Patent Literature 2 discloses a high-temperature heat-resistant member including a graphite base member with chamfered corners and a TaC film that covers the surface of the graphite base member.

The literature describes that:
(A) the corners on the surface of the graphite base member are likely to cause local cracking, lifting, peeling, or the like of the TaC film at the time of film formation or during use, and
(B) chamfering the corners of the graphite base member can suppress such cracking, lifting, peeling, or the like of the TaC film at the time of film formation or during use.

Patent Literature 3 discloses a method of manufacturing a heat-resistant graphite member, including:
(a) applying a slurry containing TaC particles onto the surface of a graphite base member to form a coating film,
(b) drying the coating film into a molded film,
(c) polishing the surface of the molded film to decrease its surface roughness or surface undulation, and
(d) heating the molded film to sinter the TaC particles to obtain a sintered film.

The literature describes that:
(A) when the sintered film is subjected to processing such as polishing or grinding, microcracks may be formed in the sintered film, and
(B) when the molded film is polished instead of the sintered film, the polishing is facilitated.

Patent Literature 4 discloses a heat-resistant graphite member including a graphite base member and a TaC film formed on the surface of the graphite base member, wherein the graphite base member has a coefficient of thermal expansion (CTE) from 5.8 to $6.4 \times 10^{-6}$/K and a bulk density from 1.83 to 2.0 g/cm$^3$.

The literature describes that, in the case of forming the TaC film on the graphite base member, when the CTE and bulk density of the graphite base member are optimized, durability and heat resistance of the heat-resistant graphite member can be improved.

Patent Literature 5 discloses a heat-resistant member including a base member composed of an isotropic graphite and a TaC film that covers the surface of the base member, wherein the TaC film has an iron content from 20 to 1000 mass ppm.

The literature describes that the optimization of the iron content in the TaC film suppresses the generation of cracks in the TaC film and improves the heat resistance of the TaC film.

Patent Literature 6 discloses a crucible for SiC single-crystal growth obtained by forming a gas barrier member composed of a metal, a metal carbide, or glassy carbon on the inner surface of a graphite crucible, although not intended to protect the heat-resistant member.

The literature describes that:
(A) when the gas barrier member is provided in the lower part (first region) of the crucible filled with raw materials, a difference in internal pressure occurs between the upper part (second region) of the crucible and the lower part (first region), and
(B) a sublimation gas flows from the lower part (first region) of the crucible having a higher internal pressure to the upper part (second region) of the crucible having a lower internal pressure.

Patent Literature 7 discloses use of molybdenum, tungsten, tantalum, molybdenum carbide, zirconium carbide, tungsten carbide, tantalum carbide, molybdenum nitride, zirconium nitride, tungsten nitride, or tantalum nitride as a material of a crucible for AlN growth, a lid body, a metal film for protecting the side surface of a seed substrate, a seed substrate support member, and a seed substrate protection member, although not intended to protect the heat-resistant member.

Nonpatent Literature 1 discloses a method of forming a tungsten-carbon thin film on the surface of a substrate composed of glassy carbon or Si (100) by a dc magnetron sputtering method.

Further, Nonpatent Literature 2 discloses a method of forming a tungsten carbide thin film on the surface of a glassy carbon substrate by a magnetron sputtering method.

In Patent Literatures 1 to 5, only TaC is used in practice as a protective film. This is because a TaC-coated graphite member has chemical stability so that it is expected to have a longer life than a SiC-coated graphite member or pBN-coated graphite member.

However, TaC has small emissivity and a large coefficient of thermal expansion (CTE). This sometimes makes it difficult to replace conventional heat-resistant members by the TaC-coated graphite member. Further, there has conventionally been no proposal example of a heat-resistant member having higher durability enough to withstand actual usage environments while keeping a CTE and emissivity equivalent to those of the conventional heat-resistant members.

CITATION LIST

Patent Literature

Patent Literature 1: Japanese Unexamined Patent Application Publication No. 2013-075814
Patent Literature 2: Japanese Unexamined Patent Application Publication No. 2013-193943
Patent Literature 3: Japanese Unexamined Patent Application Publication No. 2015-044719
Patent Literature 4: Japanese Unexamined Patent Application Publication No. 2017-075075
Patent Literature 5: Japanese Unexamined Patent Application Publication No. 2018-145022
Patent Literature 6: Japanese Unexamined Patent Application Publication No. 2018-048053
Patent Literature 7: Japanese Unexamined Patent Application Publication No. 2016-190762 [Nonpatent Literature]
Nonpatent Literature 1: Ph. Gouy-Pailler, et al., J. Vac. Sci. Technol. A11, 96(1993)
Nonpatent Literature 2: M. B. Zellner, et al., Surface Science 569(2004) 89-98

SUMMARY OF THE INVENTION

The problem to be solved by the present invention is to provide a novel heat-resistant member having both high corrosion resistance against a high-temperature corrosive gas and high emissivity.

To overcome the above-described problem, the heat-resistant member according to the present invention includes the following constitutions.

(1) The heat-resistant member includes:
a base member composed of an isotropic graphite; and
a film with a single layer or multiple layers formed on the entire or partial surface of the base member.

(2) The film includes a dense WC layer with a single layer or multiple layers, and
the dense WC layer includes WC as a main component and has a porosity of less than 3%.

The film may further include a porous WC layer with a single layer or multiple layers formed on the entire or partial surface of the dense WC layer. In this case, the porous WC layer preferably includes WC as a main component and has a porosity greater than that of the dense WC layer.

The dense WC layer is more stable than SiC or pBN under growth/film formation conditions (under a corrosive atmosphere of 1000° C. or more) of a semiconductor such as Si or a group III compound and protects the underlying graphite from the corrosive gas for a long period of time. The emissivity of the WC layer falls within a range from 30 to 80%, depending on its porosity. It is markedly higher than that of TaC (from 10 to 20%) and is close to that of SiC or pBN (80% or 70%). This requires less of a change in thermal design in replacing a SiC-coated graphite member or a pBN-coated graphite member by the WC-coated graphite member.

The film including WC as a main component has a coefficient of thermal expansion (CTE) smaller than that of TaC and is close to that of SiC or a compound semiconductor. This makes it possible to form a film including WC as a main component on a graphite substrate having a small CTE without causing cracks due to a thermal stress. As a result, even if a semiconductor polycrystal is precipitated on the surface of the heat-resistant member during growth/film formation of a semiconductor, peeling of the semiconductor polycrystal during or after growth/film formation can be suppressed. In addition, it is possible to suppress the generation of defects in the grown crystal or the epitaxial film due to the peeled off semiconductor polycrystalline particles.

DETAILED DESCRIPTION

One embodiment of the present invention will hereinafter be described in detail.

1. Heat-Resistant Member (1)

Figure 1:
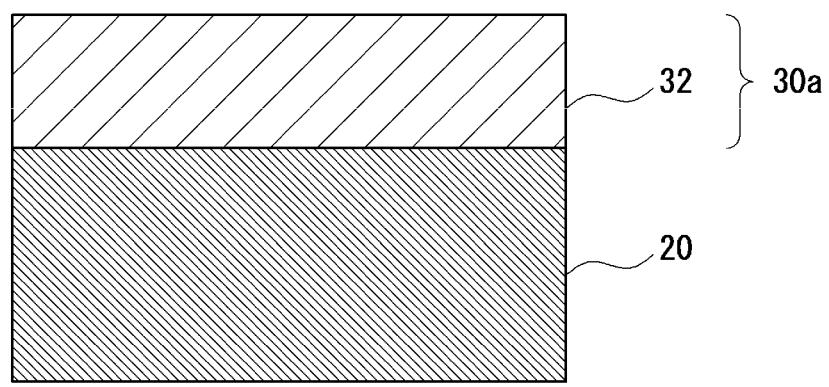
FIG. 1 is a cross-sectional schematic view of a heat-resistant member according to a first embodiment of the present invention.

FIG. 1 shows a cross-sectional schematic view of a heat-resistant member according to a first embodiment of the present invention.

In FIG. 1, a heat-resistant member 10a includes:
a base member 20 composed of an isotropic graphite; and
a film 30a with a single layer or multiple layers formed on the entire or partial surface of the base member 20.

1.1. Base Member

1.1.1. Isotropic Graphite

The base member 20 is composed of an isotropic graphite. The term "isotropic graphite" means a polycrystalline graphite material prepared by a cold isostatic press (CIP) method. Since graphite belongs to a hexagonal system, its properties are anisotropic. The isotropic graphite is, on the other hand, characterized by that the crystal orientation of each crystal grain is not oriented so that there is no difference in property among cutting-out directions.

In the present invention, the shape, size, and the like of the base member 20 are not particularly limited and the optimum ones can be selected, depending on the intended use.

1.1.2. Mean Coefficient of Thermal Expansion

The term "mean coefficient of thermal expansion" means a mean value of coefficients of thermal expansion in a temperature range from room temperature to 500° C.

The mean coefficient of thermal expansion of the base member 20 affects the durability of the film 30a. When the mean coefficient of thermal expansion of the base member 20 becomes too small, a difference in coefficient of thermal expansion between the base member 20 and the film 30a increases and the film 30a is likely to peel off. The mean coefficient of thermal expansion of the base member 20 is preferably $3.8 \times 10^{-6}$/K or more. The mean coefficient of thermal expansion is more preferably $4.0 \times 10^{-6}$/K or more, still more preferably $4.2 \times 10^{-6}$/K or more.

When the mean coefficient of thermal expansion of the base member 20 becomes too large, on the other hand, the base member 20 is likely to warp after film formation. The mean coefficient of thermal expansion of the base member 20 is therefore preferably $5.0 \times 10^{-6}$/K or less. The mean coefficient of thermal expansion is more preferably $4.8 \times 10^{-6}$/K or less, still more preferably $4.5 \times 10^{-6}$/K or less.

The isotropic graphite has usually a mean coefficient of thermal expansion of about 3.8 to $7.0 \times 10^{-6}$/K, depending on the manufacturing method or composition of it. As the material of the base member 20, it is therefore preferred to select, from various isotropic graphites, an isotropic graphite having an appropriate mean coefficient of thermal expansion.

1.2. Film

1.2.1. Film Formation Position

The film 30a is formed on the entire or partial surface of the base member 20. FIG. 1 shows the film 30a formed only on the upper surface of the base member 20, but it is only an example. That is, the film 30a may be formed on the entire surface of the base member 20 or may be formed only on the partial surface.

1.2.2. Number of Layers

The film 30a may be a single layer having the same composition and the same microstructure or may be a stack of a plurality of layers different in composition and/or microstructure. The number of layers included in the film 30a is not particularly limited and the optimum number can be selected, depending on the intended use. In FIG. 1, the film 30a includes a dense WC layer 32 with a single layer or multiple layers.

1.2.3. Dense WC Layer

A. Definition

The term "dense WC layer" means a layer including WC as a main component and having a porosity of less than 3%.

The term "including WC as a main component" means that the WC content of the dese WC layer 32 is 50 at % or more.

The "WC content (at %)" means a percentage of the sum of the number of W atoms and the number of C atoms contained in WC grains to the total number of atoms contained in the dense WC layer 32.

The dense WC layer 32 may be a single layer having the same composition and the same microstructure or may be a stack of a plurality of layers different in composition and/or microstructure, as long as the above-described conditions are satisfied.

B. Porosity

The dense WC layer 32 is required to have a porosity of less than 3%. For suppressing the corrosion of the base member 20, the porosity of the dense WC layer 32 is preferably smaller.

C. Composition

The composition of the dense WC layer 32 is not particularly limited as long as its porosity satisfies the above-described conditions. Specifically, the dense WC layer 32 may substantially include only WC and the balance may be inevitable impurities. Alternatively, the dense WC layer 32 may include a predetermined amount of a sintering aid and the balance may be WC and inevitable impurities. Further, the dense WC layer 32 may include only WC as a refractory metal compound phase or may include, in addition to WC, another refractory metal compound phase (for example, TaC, NbC, or ZrC).

In the case of forming the dense WC layer 32 by using a "sintering process" described later, a sintering aid is required to reduce the porosity. Examples of the sintering aid include Ti, Cr, Fe, Co, and Ni.

Of these, Co is preferred as the sintering aid because densification proceeds efficiently by adding a small amount of Co.

For example, when the dense WC layer 32 is formed by a sintering process while using Co as the sintering aid, Co is added to the raw materials usually in an amount of about several mass %. However, most of Co may be volatilized at the time when the densification is completed, and only a trace amount of Co may remain in the dense WC layer 32, though depending on the manufacturing conditions. The amount of Co remaining in the dense WC layer 32 differs depending on the amount of Co added to the raw materials or sintering conditions. By optimizing manufacturing conditions, it is possible to obtain a dense WC layer 32 containing Co in an amount of 0.1 mass ppm or more and 100 mass ppm or less and the balance being WC and inevitable impurities (meaning, the dense WC layer 32 substantially including only WC).

D. Lotgering F Factor

The term "Lotgering F factor" (hereinafter, also simply referred to as "F factor") means a value represented by the following formula (1). The F factor represents the degree of orientation of crystal grains constituting a polycrystal. When the F factor of a sample is "1," it means that the sample is a single crystal. On the other hand, when the F factor of a sample is "0," it means that the sample has a completely non-oriented polycrystalline structure.

$$F=(P-P_0)/(1-P_0) \qquad (1)$$

In the formula, $$P=\Sigma I(h'k'l')/\Sigma I(hkl),$$

$$P_0=\Sigma I_0(h'k'l')/\Sigma I_0(hkl),$$

$\Sigma I(h'k'l')$ is the sum total of peak areas of diffraction peaks corresponding to crystallographically equivalent specific crystal faces ((h'k'l') faces) determined from the X-ray diffraction spectrum of the object sample, $\Sigma I(hkl)$ is the sum total of peak areas of diffraction peaks corresponding to all the crystal faces determined from the X-ray diffraction spectrum of the object sample, $\Sigma I_0 (h'k'l')$ is the sum total of peak areas of diffraction peaks corresponding to crystallographically equivalent specific crystal faces ((h'k'l') faces) determined from the X-ray diffraction spectrum of a reference sample (non-oriented sample having the same composition as the object sample), and $\Sigma I_0(hkl)$ is the sum total of peak areas of the diffraction peaks corresponding to all the crystal faces determined from the X-ray diffraction spectrum of the reference sample.

The dense WC layer 32 is composed of an assembly of fine WC crystal grains. Since WC belongs to a hexagonal system, when the WC crystal grains are oriented in a specific direction, physical properties, chemical properties, and/or mechanical properties tend to be anisotropic. Accordingly, for example, when thermal stress or mechanical stress is applied to the dense WC layer 32, cracks are easily generated and the generated cracks also easily propagate.

In contrast, when WC crystal grains are in a non-oriented state, various properties of the layer become isotropic. For example, even if stress is applied to the dense WC layer 32, cracks are less likely to be generated and the generated cracks are also less likely to propagate.

In order to improve the crack resistance of the dense WC layer 32, the F factor of it is preferably smaller. More specifically, the absolute value of the F factor of all the crystal faces of the dense WC layer 32 is preferably less than 0.15.

E. Full Width at Half Maximum

The term "full width at half maximum" means a difference in angle of 2θ at the half ($f_{max}/2$) of the maximum peak value ($f_{max}$) when the diffraction peak corresponding to the (hkl) face of the X-ray diffraction spectrum is fit by a pseudo Voigt function. The full width at half maximum represents the degree of crystallinity. The smaller the full width at half maximum, the higher the crystallinity.

The dense WC layer 32 becomes thermally instable and has deteriorated durability in a high-temperature reducing gas atmosphere when crystal grains constituting the dense WC layer 32 each have low crystallinity. To achieve high heat resistance, the dense WC layer 32 has preferably higher crystallinity.

More specifically, the dense WC layer 32 is preferably a layer in which at least one of the full widths at half maximum of first to third strongest lines in the XRD diffraction spectrum is 0.2° or less. The full width at half maximum is more preferably 0.15° or less, still more preferably 0.10° or less.

The dense WC layer 32 is more preferably a layer in which at least two of the full widths at half maximum of the first to third strongest lines are the above-described value or less.

1.2.4. Total Thickness

The total thickness of the film 30a affects the durability of the film 30a. When the total thickness of the film 30a is too thin, the corrosion of the base member 20 cannot be suppressed. The total thickness of the film 30a is therefore preferably 20 μm or more. The total thickness is more preferably 40 μm or more, still more preferably 60 μm or more.

When the total thickness of the film 30a is too thick, on the other hand, the film 30a may peel off. The total thickness of the film 30a is preferably 200 μm or less. The total thickness of the film 30a is more preferably 150 μm or less, still more preferably 100 μm or less.

1.2.5. Emissivity

The emissivity of the film 30a affects the thermal design when the heat-resistant member 10a is used for various applications. In general, as the film 30a has higher emissivity, heat can be transferred more easily to another member (for example, a raw material in a crucible, a seed crystal attached to a susceptor, and the like) adjacent to the heat-resistant member 10a. Furthermore, while a SiC-coated graphite member or pBN-coated graphite member has high emissivity, the closer the emissivity of the film 30a is to that of SiC or pBN, the easier it is to replace the members without changing a thermal design.

To obtain such an effect, the film 30a has preferably emissivity (as measured by an indirect measurement method) of 30% or more and 80% or less in a temperature range from 1000° C. to 1500° C.

The emissivity of the film 30a mainly depends on the porosity of the film 30a. In general, with an increase in the porosity of the film 30a, the emissivity becomes higher. When the film 30a is composed only of the dense WC layer 32, the film 30a has emissivity from 30% to 60%, depending on the porosity or composition of the layer.

1.3. Intended Use

The heat-resistant member 10a of the present invention can be used for various members to be exposed to a high-temperature corrosive gas. Examples of such members include crucibles, susceptors, heater materials, evaporation boats, and reflector materials, each used for growing a crystal or thin film composed of a compound semiconductor.

2. Heat-Resistant Member (2)

Figure 2:
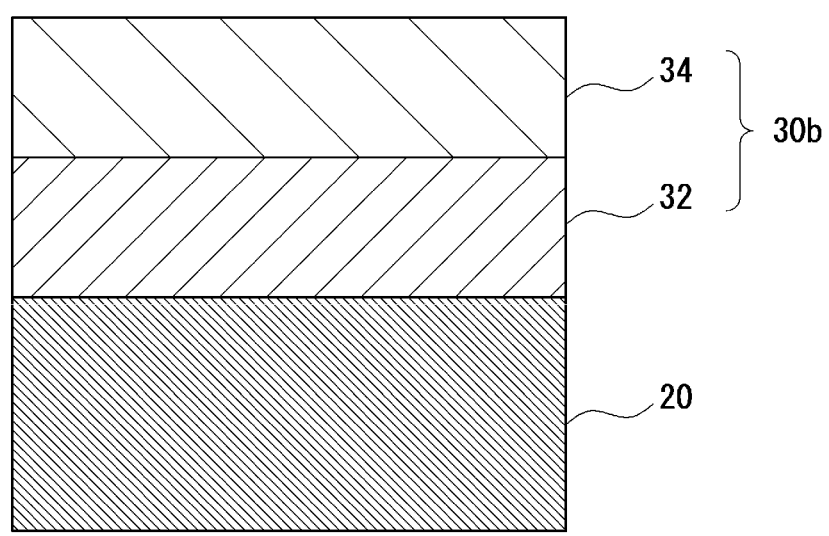
FIG. 2 is a cross-sectional schematic view of a heat-resistant member according to a second embodiment of the present invention.

FIG. 2 shows a cross-sectional schematic view of a heat-resistant member according to a second embodiment of the present invention.

In FIG. 2, a heat-resistant member 10b includes:
a base member 20 composed of an isotropic graphite; and
a film 30b with a single layer or multiple layers formed on the entire or partial surface of the base member 20.

2.1. Base Member

The base member 20 is composed of an isotropic graphite. Since the details of the base member 20 are the same as those of the first embodiment, the description thereof is omitted.

2.2. Film

2.2.1 Film Formation Position

The film 30b is formed on the entire or partial surface of the base member 20. Since the details of the formation position of the film 30b are the same as those of the first embodiment, the description thereof is omitted.

2.2.2. Number of Layers

The film 30b may be a single layer having the same composition and the same microstructure or may be a stack of a plurality of layers different in composition and/or microstructure. The number of layers included in the film 30b is not particularly limited and the optimum number can be selected, depending on the intended use. In FIG. 2, the film 30b includes a dense WC layer 32 with a single layer or multiple layers and a porous WC layer 34 with a single layer or multiple layers. In this point, the present embodiment differs from the first embodiment.

2.2.3. Dense WC Layer

The term "dense WC layer" means a layer including WC as a main component and having a porosity of less than 3%.

Since the details of the dense WC layer 32 are the same as those of the first embodiment, the description thereof is omitted.

2.2.4. Porous WC Layer

A. Definition

The term "porous WC layer" means a layer including WC as a main component and having a porosity larger than that of the dense WC layer 32.

The term "including WC as a main component" has the same meaning as that of the dense WC layer 32 so that a description thereof is omitted.

The porous WC layer 34 may be a single layer having the same composition and the same microstructure or may be a stack of a plurality of layers different in composition and/or microstructure as long as it satisfies the above-described conditions.

B. Formation Position

The porous WC layer 34 is formed on the surface of the dense WC layer 32. The porous WC layer 34 may be formed on the entire surface of the dense WC layer 32 or may be formed on the partial surface thereof.

C. Porosity

The porosity of the porous WC layer 34 is not particularly limited as long as it is larger than that of the dense WC layer 32. The emissivity of the film 30b depends on the porosity of the porous WC layer 34 located on the uppermost surface of the film 30b. In order to achieve high emissivity, the porosity of the porous WC layer 34 is preferably 20% or more. The porosity is more preferably 25% or more, still more preferably 30% or more.

On the other hand, when the porosity of the porous WC layer 34 is too large, the porous WC layer 34 may be fragile. The porosity of the porous WC layer 34 is therefore preferably 50% or less. The porosity is more preferably 45% or less, still more preferably 40% or less.

D. Composition

The composition of the porous WC layer 34 is not particularly limited as long as its porosity satisfies the above-described conditions. Specifically, the porous WC layer 34 may substantially include only WC and the balance may be inevitable impurities. Alternatively, the porous WC layer 34 may include a predetermined amount of a sintering aid and the balance may be WC and inevitable impurities. Further, the porous WC layer 34 may include only WC as a refractory metal compound phase or may include, in addition to WC, another refractory metal compound phase (for example, TaC, NbC, or ZrC).

In the case of forming the porous WC layer 34 by using "a sintering process" described later, addition of a sintering aid in an amount more than necessary sometimes reduces the porosity due to excessively advanced densification. When the porous WC layer 34 is formed by the sintering process, therefore, the amount of a sintering aid contained in the raw material of the porous WC layer 34 is preferably smaller than that contained in the raw material of the dense WC layer 32. In order to form the porous WC layer 34 having a large porosity, it is preferable to sinter the layer without the use of the sintering aid.

Since another point relating to the sintering aid is the same as that of the first embodiment, the description thereof is omitted.

2.2.5. Thickness

A. Total Thickness

The total thickness of the film 30b affects the durability of the film 30b. Since the details of the total thickness are the same as those of the first embodiment, the description thereof is omitted.

B. Thickness of Porous WC Layer

The thickness of the porous WC layer 34 is not particularly limited and an optimum thickness can be selected depending on the intended use. When the thickness of the porous WC layer 34 is too thin, the emissivity cannot be sufficiently improved. The thickness of the porous WC layer 34 is therefore preferably 5 µm or more. The thickness is more preferably 10 µm or more, still more preferably 20 µm or more.

On the other hand, when the thickness of the porous WC layer 34 is too thick, it may be difficult to manufacture the porous WC layer 34. The thickness of the porous WC layer 34 is therefore preferably 50 µm or less. The thickness is more preferably 40 µm or less.

2.2.6. Emissivity

Since the film 30b has an uppermost surface composed of the porous WC layer 34, it has higher emissivity than that of the film 30a composed only of the dense WC layer 32. By optimizing the porosity or the composition of the porous WC layer 34, the emissivity thereof falls within the range from 40 to 80%. Since another point relating to emissivity is the same as that of the first embodiment, the description thereof is omitted.

2.3. Intended Use

The heat-resistant member 10b of the present invention can be used for various members to be exposed to a high-temperature corrosive gas. Since the details of the intended use of the heat-resistant member 10b are the same as those of the first embodiment, the description thereof is omitted.

3. Method of Manufacturing Heat-Resistant Member

The heat-resistant member according to the present invention can be manufactured by a variety of methods. Of these, a sintering process is suitable as a method of manufacturing a heat-resistant member because a porosity can be easily controlled.

The term "sintering process" as used herein means a process of:

(a) applying a first slurry containing WC powders onto the surface of a base member composed of an isotonic graphite, followed by drying to form a first molded film on the surface of the base member;

(b) applying a second slurry containing WC powders onto the surface of the first molded film if necessary, followed by drying to form a second molded film on the surface of the first molded film; and (c) heating the base member having thereon the first molded film and the optionally formed second molded film in an inert atmosphere to sinter the first molded film and the second molded film.

3.1. First Step

First, a first slurry containing WC powders is applied onto the surface of a base member composed of an isotropic graphite, followed by drying (first step). Thereby, a first molded film can be formed on the surface of the base member.

The first slurry is a raw material for forming a dense WC layer. The first molded film is a layer that becomes the dense WC layer by sintering. Since WC is a hardly sinterable compound, the first slurry is required to contain an adequate amount of a sintering aid in order to form the dense WC layer. The first slurry may further contain an organic binder, dispersant, and the like if necessary.

The average particle size of the WC powders, kind and amount of the sintering aid, the composition of the first slurry, and the like are not particularly limited and optimum ones can be selected, depending on the intended use.

When the dense WC layer includes multiple layers different in composition and/or microstructure, a plurality of first molded films are formed using a plurality of first slurries different in composition.

In general, when an amount of the sintering aid added to the first slurry is too small, the densification does not proceed sufficiently, leading to an increase in porosity. On the other hand, when an excessively large amount of the sintering aid is added, the sintering aid may remain in the dense WC layer. Such a remaining sintering aid may leak during use to become a contamination source. A preferable addition amount of the sintering aid differs depending on the kind of the sintering aid. For example, when the sintering aid is Co, the amount of the sintering aid is preferably from 0.1 to 5 mass %.

3.2. Second Step

Next, a second slurry containing WC powders is applied onto the surface of the first molded film if necessary, followed by drying (second step). Thereby, a second molded film can be formed on the surface of the first molded film. However, when a porous WC layer is not formed, the second step can be omitted.

The second slurry is a raw material for forming a porous WC layer. The second molded film is a layer that becomes the porous WC layer by sintering. Since WC is a hardly sinterable compound, the second slurry is not necessarily required to contain a sintering aid for the formation of the porous WC layer. Rather, use of a second slurry not containing a sintering aid facilitates formation of the porous WC layer. The second slurry may further contain an organic binder, a dispersant, a pore forming agent, and the like, if necessary.

The average particle size of the WC powders, the kind and amount of the sintering aid, the composition of the second slurry, and the like are not particularly limited and optimum ones can be selected according to the intended use.

When the porous WC layer includes multiple layers different in composition and/or microstructure, a plurality of second molded films are formed using a plurality of second slurries different in composition.

3.3. Third Step

Next, the base member having thereon the first molded film and the optionally formed second molded film is heated in an inert atmosphere to sinter the first molded film and the second molded film (third step). The heat-resistant member of the present invention can thus be obtained.

As sintering conditions, optimum ones are selected according to the respective compositions of the first molded film and the second molded film. Although the optimum sintering conditions differ depending on the characteristics of the raw material powders or the composition of the slurry, it is preferable to heat at 2000° C. to 2300° C. for about 0.5 to 1.0 hour.

4. Effect

The dense WC layer is more stable than SiC or pBN under growth/film formation conditions (under a corrosive atmosphere of 1000° C. or more) of a semiconductor such as Si or a group III compound and protects the underlying graphite from the corrosive gas for a long period of time. The emissivity of the WC layer falls within a range from 30 to 80%, depending on its porosity. It is markedly higher than that (from 10 to 20%) of TaC and is close to that of SiC or pBN (80% or 70%). This requires less of a change in thermal design in replacing a SiC-coated graphite member or a pBN-coated graphite member by the WC-coated graphite member.

The film including WC as a main component has a coefficient of thermal expansion (CTE) smaller than that of TaC and is close to that of SiC or a compound semiconductor. This makes it possible to form a film including WC as a main component on a graphite substrate having a small CTE without causing cracks due to thermal stress. As a result, even if a semiconductor polycrystal is precipitated on the surface of the heat-resistant member during growth/film formation of a semiconductor, peeling of the semiconductor polycrystal during or after growth/film formation can be suppressed. In addition, it is possible to suppress the generation of defects in the grown crystal or the epitaxial film due to the peeled off semiconductor polycrystalline particles.

Examples 1 and 2, Comparative Examples 1 to 3

1. Preparation of Sample

1.1. Example 1

A plate (φ100×3 mm or □50×3 mm) composed of an isotropic graphite having a mean coefficient of thermal expansion of $4.8 \times 10^{-6}$/K was used as a base member. A first slurry was obtained by adding WC powders having an average particle size of 1 to 3 μm, Co powders (in an amount corresponding to from 0.5 to 2.0 mass % in terms of a content in a molded film (a film after drying but before sintering)) having an average particle size of 0.05 to 0.5 μm, and an organic binder to an organic solvent. The first slurry was applied by spray to the surface of the base member to form a first molded film. The thickness of the first molded film was adjusted so that the thickness after sintering would be about 100 μm.

The base member with the first molded film was heated on a hot plate at 150° C. for 30 minutes to remove the organic solvent contained in the first molded film. Further, sintering was performed by retaining the base member at 2000° C. for one hour in an inert atmosphere containing Ar as a main component to obtain a WC-coated graphite member composed of a dense WC layer/graphite. The Co content in the dense WC layer was 100 mass ppm or less.

1.2. Example 2

As in Example 1, a first molded film was formed on the surface of the base member.

Next, a second slurry was obtained by adding WC powders having an average particle size of 1 to 3 µm and an organic binder to an organic solvent. The second slurry was applied using a brush onto the surface of the first molded film to form a second molded film. The thickness of the second molded film was adjusted to from 10 to 30 µm.

The removal of the organic solvent and sintering were performed as in Example 1 to obtain a WC-coated graphite member composed of porous WC layer/dense WC layer/graphite.

1.3. Comparative Example 1

A TaC-coated graphite member composed of dense TaC layer/graphite was produced in the same manner as in Example 1 except that TaC powders having an average particle size of 1 to 3 µm were used instead of the WC powders.

1.4. Comparative Example 2

A TaC-coated graphite member composed of dense TaC layer/graphite was produced in the same manner as in Comparative Example 1 except that a plate composed of an isotropic graphite having a mean coefficient of thermal expansion of $6.2 \times 10^{-6}$/K was used as a base member.

1.5. Comparative Example 3

A TaC-coated graphite member composed of porous TaC layer/dense TaC layer/graphite was produced in the same manner as in Example 2 except that a plate composed of an isotropic graphite having a mean coefficient of thermal expansion of $6.2 \times 10^{-6}$/K was used as a base member and TaC powders having an average particle size of 1 to 3 µm were used instead of the WC powders.

2. Test Method

2.1. Porosity

A test piece for observing the cross-section was prepared from the sample after sintering, and the thickness of the film after sintering was evaluated by SEM. In addition, a theoretical film thickness was calculated based on the charged weight of the slurry and theoretical density of powders. Further, a porosity was calculated from a difference between the film thickness determined by the SEM observation and the theoretical film thickness.

2.2. Evaluation of Thermal Stress-Induced Cracks

Presence or absence of thermal stress-induced cracks (cracks having a width of several µm) on the surface of the film was observed using an optical microscope.

2.3. Measurement of Emissivity

Dependence of emissivity on temperature (from room temperature to 2500° C.) was measured and calculated in accordance with an indirect measurement method (JIS R1693-2:2012).

2.4. XRD Measurement

XRD measurement of each sample was performed at respectively different three positions. From the XRD spectra thus obtained, an average value of diffraction peak intensities was determined. Further, an F factor of each crystal face was calculated based on the average value thus obtained.

3. Results

3.1. Porosity

The porosity of the dense WC layers obtained in Examples 1 and 2 was each less than 1%. In contrast, the porosity of the porous WC layer obtained in Example 2 was about 30%.

The porosity of the dense TaC layers obtained in Comparative Examples 1 to 3 was from 1 to 3%. In contrast, the porosity of the porous TaC layer obtained in Comparative Example 3 was 32%.

3.2. Evaluation of Thermal Stress-Induced Cracks

Table 1 shows the evaluation results of thermal stress-induced cracks. Table 1 also shows the measurement results of emissivity. The thermal stress-induced cracks were not confirmed in any of Example 1 and 2. On the other hand, the thermal stress-induced cracks were confirmed in Comparative Example 1, while the thermal stress-induced cracks were not confirmed in any of Comparative Example 2 and 3. This is presumably because the mean coefficient of thermal expansion of the base member used in Comparative Examples 2 and 3 was close to that of TaC.

TABLE 1

| | Layer structure | CTE of Graphite base member ($\times 10^{-6}$/K) (RT~500° C.) | Emissivity of film (%) (1000~ 2500° C.) | Thermal stress-induced cracks in film |
|---|---|---|---|---|
| Example 1 | Dense WC/Graphite | 4.8 | 35.7~54.2 | None |
| Example 2 | Porous WC/Dense WC/Graphite | 4.8 | 48.3~68.8 | None |
| Comparative Example 1 | Dense TaC/Graphite | 4.8 | — | Found |
| Comparative Example 2 | Dense TaC/Graphite | 6.2 | 13.5~19.8 | None |
| Comparative Example 3 | Porous TaC/Dense TaC/Graphite | 6.2 | 27.1~38.3 | None |

3.3. Emissivity

Figure 3:
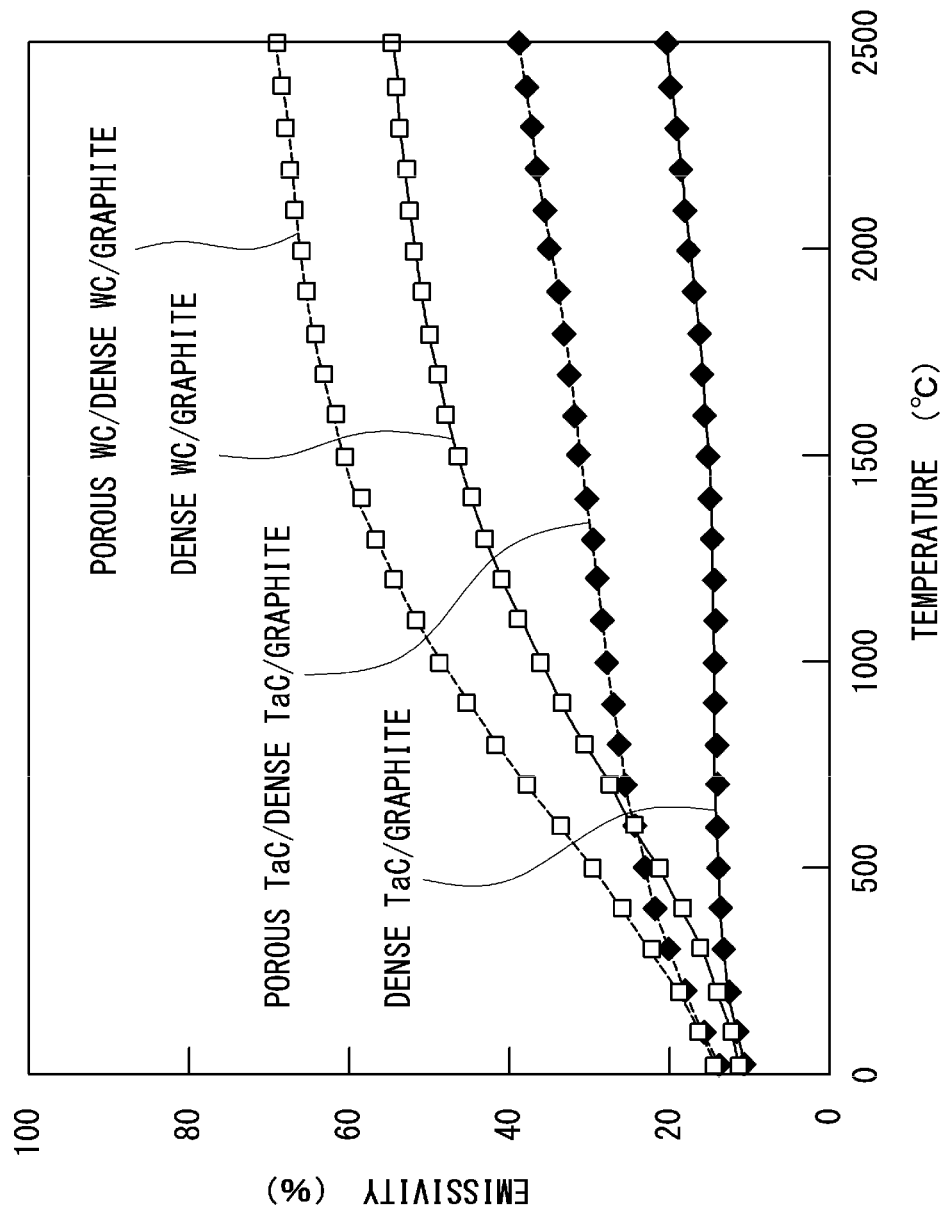
FIG. 3 is the temperature dependence of emissivity as measured by an indirect measurement method.

FIG. 3 shows temperature dependence of emissivity as measured by an indirect measurement method. In addition, Table 1 shows a range of emissivity at 1000° C. to 2500° C. The following was found from FIG. 3 and Table 1:

(1) The emissivity of the dense WC layer was much larger than that of the dense TaC layer.

(2) The emissivity of the porous WC layer was still larger than that of the dense WC layer, and was close to that of SiC or pBN.

3.4. Xrd Measurement

3.4.1. XRD Spectrum

Figure 4:
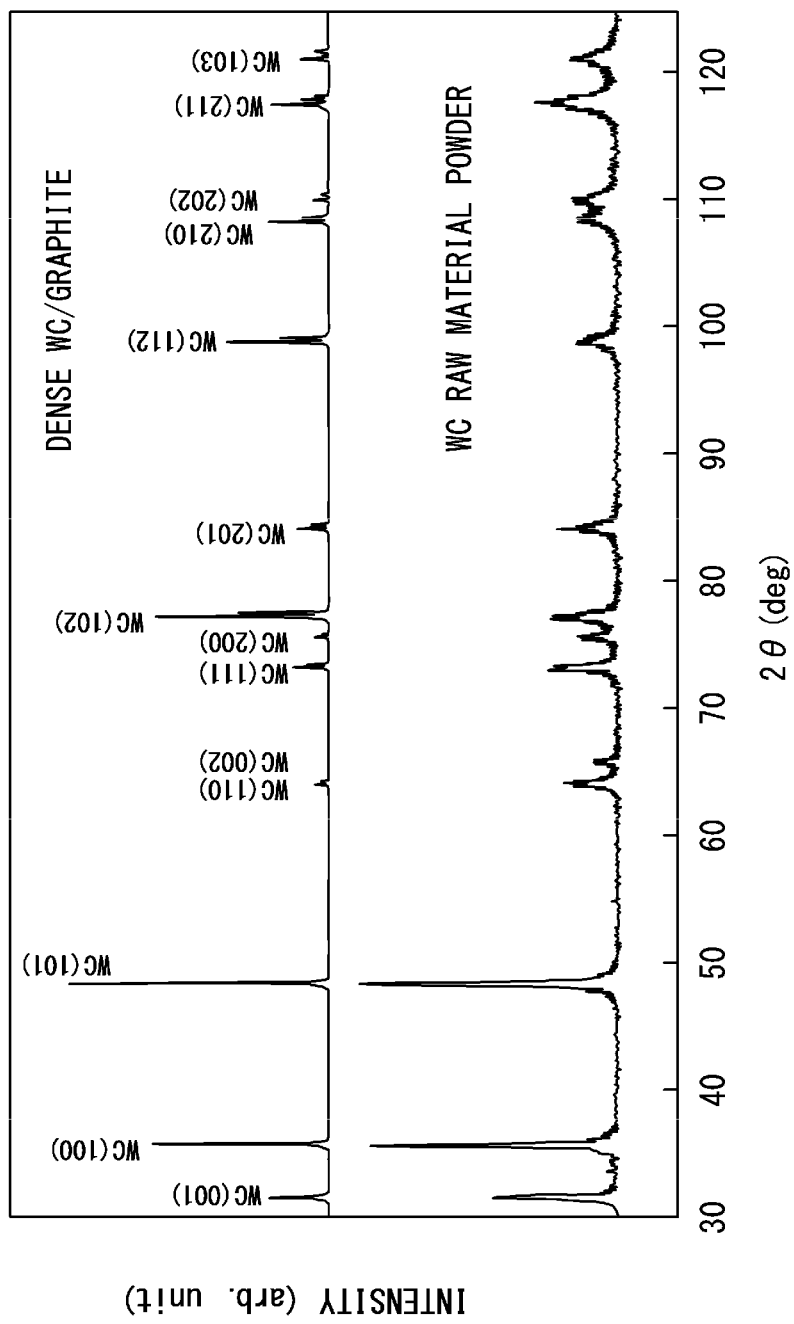
FIG. 4 is an XRD spectrum (upper one) of a heat-resistant member composed of dense WC layer/graphite and an XRD spectrum (lower one) of WC raw material powders.

FIG. 4 shows the XRD spectrum (upper) of the heat-resistant member (Example 1) composed of dense WC layer/graphite and the XRD spectrum (lower) of the WC raw material powders. It was confirmed from FIG. 4 that the dense WC layer was composed of a WC single-phase film having a stoichiometric ratio of 1:1. A film formed by PVD, CVD, or sputtering is not a WC single-phase film but is often a mixed-phase film having $W_2C$ or $WC_{1-x}$ therein (refer to Nonpatent Literature 1).

3.4.2. Full Width at Half Maximum

It was found from FIG. 4 that the diffraction peak of the dense WC layer was extremely sharp and the dense WC layer had high crystallinity. Table 2 shows the full width at half maximum of the first to third strongest lines included in the XRD spectrum measured at respectively different three positions of the dense WC layer (Example 1). Table 2 also shows the full width at half maximum of the WC raw material powders. The full width at half maximum of each of the first to third strongest lines of the dense WC layer was 0.2° or less.

TABLE 2

| | Full width at half maximum (deg) | | |
|---|---|---|---|
| | First strongest line WC(101) | Second strongest line WC(100) | Third strongest line WC(001) |
| #1_Dense WC/Graphite | 0.057 | 0.078 | 0.098 |
| #2_Dense WC/Graphite | 0.152 | 0.151 | 0.102 |
| #3_Dense WC/Graphite | 0.062 | 0.091 | 0.065 |
| WC Raw Material Powder | 0.327 | 0.267 | 0.294 |

3.4.3. F Factor

Table 3 shows the average diffraction peak intensity and F factor of each crystal face determined from the XRD spectra measured at respectively different three positions of the dense WC layer (Example 1). It was found from Table 3 that the dense WC layer had an F factor (absolute value) of less than 0.15 in any orientation and was a completely random orientation. A non-oriented structure with high crystallinity is expected to have high durability and is presumed to contribute to improvement in quality and throughput of a semiconductor growth/film formation process.

TABLE 3

| | I(h k l) (area %) | | Lotgering |
|---|---|---|---|
| (h k l) | WC-coated layer | WC powder | F factor |
| (0 0 1), (0 0 2) | 29.5 | 41.6 | 0.000 |
| (1 0 0), (2 0 0) | 65.5 | 96.7 | −0.009 |
| (1 0 1), (2 0 2) | 108.3 | 117.5 | 0.078 |
| (1 1 0) | 5.9 | 23.9 | −0.028 |
| (1 1 1) | 16.5 | 35.1 | −0.022 |

TABLE 3-continued

| | I(h k l) (area %) | | Lotgering |
|---|---|---|---|
| (h k l) | WC-coated layer | WC powder | F factor |
| (1 0 2) | 39.0 | 34.1 | 0.039 |
| (2 0 1) | 15.1 | 28.7 | −0.014 |
| (1 1 2) | 39.4 | 30.6 | 0.046 |
| (2 1 0) | 29.8 | 53.4 | −0.022 |
| (2 1 1) | 37.3 | 69.9 | −0.034 |
| (1 0 3) | 20.2 | 42.7 | −0.027 |

Examples 3 and 4, Comparative Example 4

1. Preparation of Sample

A WC-coated graphite member composed of dense WC layer/graphite was produced in the same manner as in Example 1 except that the amount of Co powders added to the first slurry was adjusted to give a porosity of 1% (Example 3), 2% (Example 4), or 6% (Comparative Example 4).

2. Test Method (Evaluation of Durability)

Each sample was annealed in a $NH_3$ atmosphere and a weight reduction rate was measured. The $NH_3$ annealing was performed under conditions of a temperature of 1200° C., a retention time of 1 hour, an $NH_3$ flow rate of 3 slm, an $N_2$ flow rate of 2 slm, and a total pressure of 6 kPa.

3. Results

Figure 5:
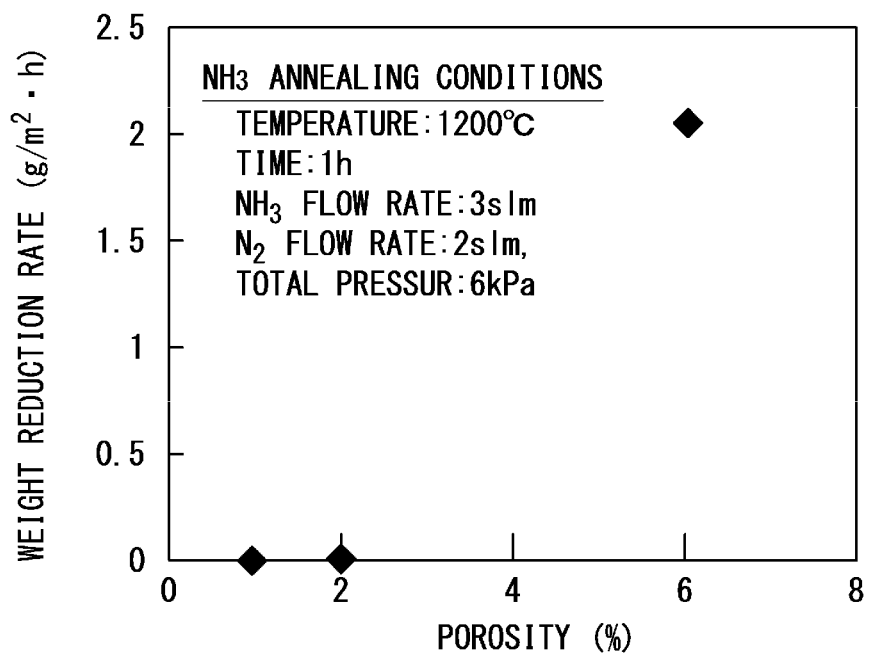
FIG. 5 is the results of a durability test of a WC-coated graphite member.

FIG. 5 shows the results of the durability test of the WC-coated graphite member. It was found from FIG. 5 that at a porosity exceeding 3%, the weight reduction rate increased markedly and the damage of the graphite base member below WC coating became remarkable. It was also found that the porosity of the dense WC layer was required to be less than 3% to certainly provide a WC-coated graphite member having durability.

Details of the embodiments of the present invention have been described above, but the present invention is not limited to or by the above embodiments. The present invention can be modified in various ways without departing from the gist of the present invention.

The heat-resistant member of the present invention can be used for crucibles, susceptors, heater materials, evaporation boats, reflector material, and the like for growing a crystal or thin film composed of a compound semiconductor.

What is claimed is:

1. A heat-resistant member, comprising:
   a base member composed of an isotropic graphite; and
   a film with a single layer or multiple layers formed on an entire or partial surface of the base member,
   wherein the film includes a dense WC layer with a single layer or multiple layers, and
   the dense WC layer includes WC as a main component and has a porosity of greater than 0% and less than 3%.

2. The heat-resistant member according to claim 1, wherein the base member has a mean coefficient of thermal expansion of $3.8 \times 10^{-6}$/K or more and $5.0 \times 10^{-6}$/K or less in a temperature range from room temperature to 500° C.

3. The heat-resistant member according to claim 1, wherein an absolute value of a Lotgering F factor of all the crystal faces of the dense WC layer as calculated from an XRD diffraction spectrum is less than 0.15.

4. The heat-resistant member according to claim 1, wherein at least one of full widths at half maximum of first to third strongest lines of the dense WC layer in an XRD diffraction spectrum is 0.2° or less.

5. The heat-resistant member according to claim 1, wherein the dense WC layer contains 0.1 mass ppm or more and 100 mass ppm or less of Co and the balance is WC and inevitable impurities.

6. The heat-resistant member according to claim 1,
wherein the film further includes a porous WC layer with a single layer or multiple layers formed on an entire or partial surface of the dense WC layer, and
the porous WC layer includes WC as a main component and has a porosity larger than that of the dense WC layer.

7. The heat-resistant member according to claim 6, wherein the porous WC layer has a porosity of 20% or more.

8. The heat-resistant member according to claim 1, wherein the film has a total thickness of 20 μm or more and 200 μm or less.

9. The heat-resistant member according to claim 1, wherein the film has emissivity, as measured by an indirect measurement method, of 30% or more and 80% or less in a range from 1000° C. to 1500° C.

10. The heat-resistant member according to claim 1, for use in a crucible, susceptor, heater material, evaporation boat, or reflector material for growing a compound semiconductor into a crystal or thin film.

* * * * *